United States Patent [19]
Farrington et al.

[11] Patent Number: 5,912,549
[45] Date of Patent: Jun. 15, 1999

[54] CURRENT MODE CONTROLLER FOR CONTINUOUS CONDUCTION MODE POWER FACTOR CORRECTION CIRCUIT AND METHOD OF OPERATION THEREOF

[75] Inventors: Richard W. Farrington, Mesquite; William P. Gardiner, Dallas; Mark E. Jacobs, Dallas; Hengchun Mao, Dallas, all of Tex.

[73] Assignee: Lucent Technologies Inc., Murray Hill, N.J.

[21] Appl. No.: 08/905,105

[22] Filed: Aug. 1, 1997

[51] Int. Cl.$^6$ .................................................. G05F 1/70
[52] U.S. Cl. ............................................................. 323/207
[58] Field of Search ..................... 363/16, 19, 21, 363/95, 131; 323/207, 209, 210

[56] References Cited

U.S. PATENT DOCUMENTS

| | | | |
|---|---|---|---|
| 4,119,907 | 10/1978 | Quinn | 363/89 |
| 5,568,041 | 10/1996 | Hesterman | 323/207 |
| 5,687,070 | 11/1997 | Jacobs | 363/126 |
| 5,734,562 | 3/1998 | Redl | 363/16 |

OTHER PUBLICATIONS

Publication entitled "An Overview of Power Factor Correction in Single–Phase Off–Line Power Supply Systems" by J. Sebastián, M. Jaureguizar and J. Uceda; 1994 IEEE; pp. 1688–1693.

Les Hadley, Power Factor Correction Using A Preregulating Boost Converter, Oct. 1989 Proceedings, (pp. 376–382).

Richard Redl, Reducing Distortion in Boost Rectifiers with Automatic Control, 1997 IEEE, (pp. 74–80).

Joel P Gegner, C.Q. Lee, Linear Peak Current Mode Control: A Simple Active Power Factor Correction Control Technique For Continuous Conduction Mode, Proceedings of PESC 1996, (pp. 196–202).

Jeffrey Hwang, Alland Chee, Wing–Hung Ki, New Universal Control Methods for Power Factor Correction and DC to DC Converter Applications, 1997 IEEE (pp. 59–65).

Zheren Lai and Keyue M. Smedley, A Family of Power–Factor–Correction Controllers, 1997 IEEE, (pp. 66–73).

Jay Rajagopalan, Fred C. Lee and Paolo Nora, A Generalized Technique for Derivation of Linear Average Current Mode Control Laws for Power Factor Correction without Input Voltage Sensing, VPEC Seminar Proceedings–Sep. 19–21, 1996 (pp. 23–28).

Dragan Maksimovic, Yungtaek Jang and Robert Erickson, Nonlinear–Carrier Control for High Power Factor Boost Rectifiers, Proceedings of APEC 1995 IEEE (pp. 635–641).

Zheren Lai and Keyue M. Smedley, A General constant Frequency Pulse–Width Modulator and Its Applications, HFPC Power Conversion–Sep. 1996 Proceedings (pp. 279–290).

*Primary Examiner*—Matthew Nguyen

[57] ABSTRACT

For use with a power factor correction circuit, a current mode controller, a method of operating current mode control to achieve power factor correction thereof and a power supply incorporating the controller or the method. In one embodiment, the controller includes: (1) a modulator, coupled to a switch in the power factor correction circuit, that senses an electrical characteristic and a current passing through the power factor correction circuit and provides, in response thereto, a control signal to the switch and (2) a compensation circuit, coupled to an input of the power factor correction circuit, that provides a compensation signal to the modulator that is a function of a rectified line voltage provided to the input of the power factor correction circuit. The compensation signal causes the modulator to modify the control signal to reduce a total harmonic distortion (THD) of the power factor correction circuit.

21 Claims, 7 Drawing Sheets

# CURRENT MODE CONTROLLER FOR CONTINUOUS CONDUCTION MODE POWER FACTOR CORRECTION CIRCUIT AND METHOD OF OPERATION THEREOF

TECHNICAL FIELD OF THE INVENTION

The present invention is directed, in general, to power conversion and, more specifically, to a current mode controller for a power factor correction circuit operating in a continuous conduction mode (CCM) that handles a relatively wide range of ac input voltages and a method of operating a current mode control in CCM to achieve power factor correction.

BACKGROUND OF THE INVENTION

Over the past ten years, substantial efforts have been dedicated to the design of controllers for switching power supplies required to provide electrical power having both a high power factor and low total harmonic distortion (THD). One objective in designing such controllers has been to distort as little as possible the AC line current that is provided to such switching power supplies.

For a time, it was believed that the International Electronic Commission would subject electrical equipment, such as computers and communication devices, to a proposed standard IEC-555, which called for THD limits as low as 5%. However, the IEC never adopted IEC-555, opting instead to approve IEC-1000.3.2 (incorporated herein by reference) imposing less-rigorous THD limits.

For power supplies operating at about 1.5 kW (at 110 VAC or about 3 KW at 220 VAC), IEC-1000.3.2 limits the allowable input current THD to 5%, as did the proposed IEC-555 standard. However, for power supplies operating below 600 W, the IEC-1000.3.2 standard allows THD of up to 30%.

Peak current mode control and average current mode control are two well-known, alternative approaches to regulating the output voltage of switching power supplies to achieve high power factor. Presently, the industry-preferred approach is average current mode control.

In conventional average current mode control, the control voltage (representing an error between the actual output voltage and a reference voltage) is used to produce a reference current to modulate a desired input current. Therefore, the control voltage directly controls the output voltage. Ideally, the control voltage in the conventional average current mode controller directly controls the average value of the current passing through the inductor for the fastest response.

Unfortunately, the conventional average current mode control is more complex and expensive to implement than is alternative peak current mode control. Additionally, high power factors and lower THD are attainable using peak current mode control for narrow input voltages and load variations. See, "An Overview of Power Factor Correction in Single-Phase Off-Line Power Supply Systems" by J. Sebastian, et al., IECON94 Proceedings, incorporated herein by reference.

In peak current mode control, the switch or inductor current is compared with a threshold signal. THD of less than 5% is realizable if the parameters of the ramp waveform are appropriately selected for the particular line current. Peak current mode control, however, has difficulties in providing low line current distortions over a wide range of AC input voltages and output loads.

Various enhancements extending the circuit design of basic peak current mode control have attempted to adjust the circuit parameters of the ramp waveform to extend the practical operating range of peak current mode control. These enhancements include feed-forward from the rectified AC line voltage to correct the parameters of the ramp waveform. Another approach uses the output of the voltage amplifier to correct the ramp, so as to increase the practical range of operation in discontinuous conduction mode (DCM). See, "Power Factor Correction Using a Preregulating Boost Converter" by L. Hadley, Power Conversion Proceedings, October 1989, pp. 376–382, and "Reducing Distortion in Boost Rectifiers with Automatic Control" by R. Redl, Applied Power Electronics Conference Proceedings, 1997, pp. 74–80, which are incorporated herein by reference.

However, the techniques and enhancements described in the above-mentioned publications are only applicable to converters, i.e., boost converters, operating in DCM. Similar problems and limitations faced by converters operating in continuous conduction mode (CCM) are not addressed. Furthermore, although those techniques discussed above have been able to improve the operating range of the power factor correction stage in DCM of operation, there are still regions of very high THD (greater than 40%) for power supplies required to operate from 85 VAC to 265 VAC (commonly known as "universal input").

Accordingly, what is needed in the art is an improvement to current mode control that permits CCM operation and provides lower THD over a wider range of input voltages and load variations.

SUMMARY OF THE INVENTION

To address the above-discussed deficiencies of the prior art, the present invention provides, for use with a power factor correction circuit operable in CCM, a current mode controller, a method of operating a power factor correction circuit to achieve current mode control thereof and a power supply incorporating the controller or the method. In one embodiment, the controller includes: (1) a modulator, coupled to a switch in the power factor correction circuit, that senses an electrical characteristic and a current passing through the power factor correction circuit and provides, in response thereto, a control signal to the switch and (2) a compensation circuit, coupled to the power factor correction circuit, that provides a compensation signal to the modulator that is a function of a rectified line voltage provided to the power factor correction circuit. The compensation signal causes the modulator to modify the control signal to reduce a THD of the power factor correction circuit.

The present invention introduces the broad concept of employing a harmonic component present in the rectified AC line voltage provided to the power factor correction circuit, in combination with the sensing of a current in the power factor correction circuit, to modify the control signal provided to the switch in the power factor correction circuit. This serves to compensate for variations in input voltage and reduce the THD of the power factor correction circuit.

In one embodiment of the present invention, the electrical characteristic is an output voltage of the power factor correction circuit. Those skilled in the art will recognize, however, that control based on other than the output voltage may be advantageous in certain applications.

In one embodiment of the present invention, the compensation circuit comprises a capacitor coupling the input of the power factor correction circuit to the modulator. The capacitor, while not necessary to the present invention, provides sign and phase adjustment to the compensation signal.

In one embodiment of the present invention, the modulator comprises an amplifier and a feedback path coupling an output of the amplifier to an input thereof, the feedback path including a capacitor. The capacitor in the feedback path acts as an integrator, generating a feedback compensating signal that governs transitions in the control signal.

In one embodiment of the present invention, the compensation signal is dependent on the value of a capacitor in the compensation circuit. In an embodiment to be illustrated and described, the capacitor in the compensation circuit modifies the effective slope of the ramp that the capacitor in the modulator creates by integration.

In one embodiment of the present invention, the control signal is a function of an input inductor current. In alternative embodiments to be illustrated and described, the control signal may be created by other than directly sensing the input inductor current.

In one embodiment of the present invention, the controller further comprises an input voltage detection circuit that senses a rectified voltage provided to the power factor correction circuit and modifies the control signal as a function thereof. Alternatively, a circuit may sense an error signal in the modulator and modify the control signal as a function thereof. One way to modify the control signal is to modify a resistance in the modulator.

In an embodiment to be illustrated and described, the input voltage detection circuit divides the range of input voltage into two sub-ranges and changes the resistance in the modulator depending upon whether the input voltage is in one sub-range or the other. This effectively changes the amplitude of the current signal fed back to the modulator to adapt to the particular sub-range encountered. Of course, other embodiments may provide more than two sub-ranges or a continuously variable ramp slope.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
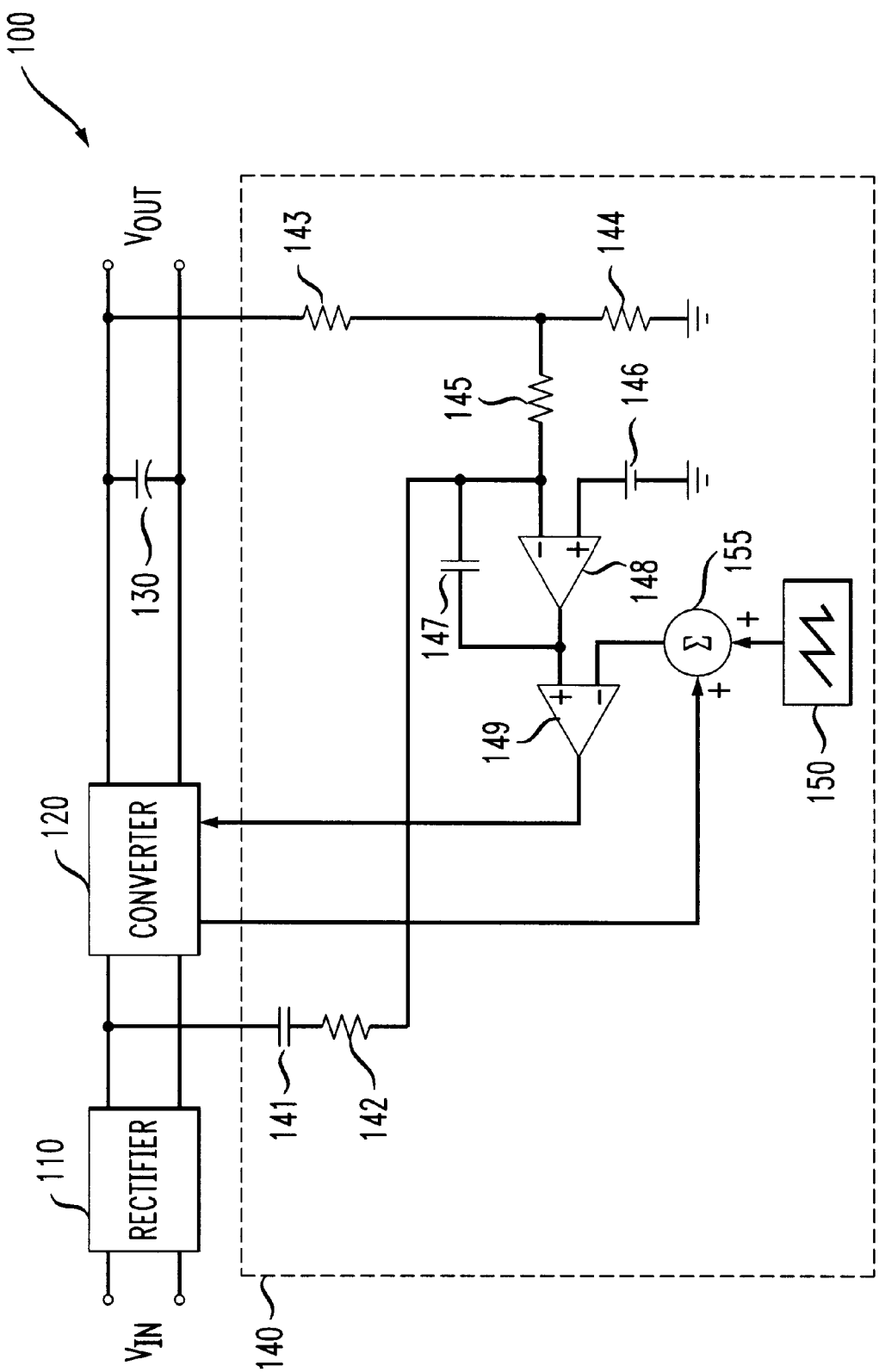
FIG. 1 illustrates a schematic diagram of a switching power supply employing an embodiment of a current mode controller constructed according to the principles of the present invention.

Referring initially to FIG. 1, illustrated is a schematic diagram of a switching power supply 100 employing an embodiment of a current mode controller 140 constructed according to the principles of the present invention. The switching power supply 100 includes a rectifier 110 that is coupled to a converter 120. The converter 120 (one embodiment of a power factor correction circuit, and which may be, for instance, a boost power factor correction converter) is also coupled to an output capacitor 130. Also shown is the current mode controller 140 that is coupled to the rectifier 110, converter 120 and the output capacitor 130. The rectifier converts AC power into rectified power having a harmonic current component.

The current mode controller 140 includes a modulator and a compensation circuit. The mode controller 140 includes a first and second resistor 143, 144 that make up a voltage divider circuit. A third resistor 145 is coupled to the first and second resistors 143, 144 and to an inverting input of a voltage-feedback operational amplifier (op-amp) 148. An integrating capacitor 147 is coupled (in a feedback path) between the inverting input and the output of the voltage-feedback op-amp 148. Those skilled in the art should be aware that although a capacitor is used in the feedback circuit of the voltage-feedback op-amp 148, other circuit feedback configurations may also be used. The non-inverting input of the voltage-feedback op-amp 148 is coupled to a reference voltage 146. The output of the voltage-feedback op-amp 148 is coupled to the non-inverting input of a comparator op-amp 149. The output of the comparator op-amp 149 is coupled to a switch (not shown) in the converter 120 and the inverting input of the comparator op-amp 149 is also coupled to the converter 120 and a summing node 155. The summing node 155 is coupled to an external ramp waveform generator 150. The modulator, in the illustrated embodiment, includes the resistors 143, 144, 145, the voltage reference 146, the integrating capacitor 147, the op-amps 148, 149, the summing node 155 and the ramp generator 150. The compensation circuit includes a compensating capacitor 141 coupled in series with a compensating resistor 142. Typically, the compensation circuit should be similar to the feedback circuit (the integrating capacitor 147) of the voltage-feedback op-amp 148. The compensation circuit is coupled to a node (shown, but not referenced) between the rectifier 110 and the converter 120 and to the modulator.

The operation of the current mode controller 140 will hereinafter be described. The output voltage of the converter 120 is sensed by the voltage divider circuit (including the first and second resistors 143, 144) and a fixed proportion of the sensed output voltage is applied to the inverting input of the voltage-feedback op-amp 148. The rectified line voltage at the output of the rectifier 110 is also sensed and a proportional value of the sensed rectified line voltage is injected into the inverting input of the voltage-feedback op-amp 148. The rectified line voltage contains a distinct 2nd order (e.g., 120 Hz for a 60 Hz input line) harmonic current component that can be used to compensate and modulate the pulse width modulation (PWM) signal to increase the duty cycle when the rectified line voltage is close to the cross-over points and, conversely, to decrease the duty cycle when the rectified line voltage is at its peak. By controlling the duty cycles, the cross-over distortions can be minimized as the line voltage increases. The sensed rectified line voltage is coupled through the compensating capacitor 141 to obtain the proper sign and phase at the output of the voltage-feedback op-amp 148. The 2nd line harmonic voltage component present in the output voltage also contributes to the amount of 2nd line harmonic voltage component present at the output of the voltage-feedback op-amp 148. Also, a percentage of the voltage-feedback op-amp 148 output signal that is from the voltage feedback loop is 180 degrees phase shifted relative to the signal fed forward through the integrating capacitor 147. The effect of the line and load variations can be minimized by adjusting the contributions of the sensed rectified line and output voltage signals. The output signal of the voltage-feedback op-amp 148 is compared to a signal composed of the sensed converter switch current and the ramp waveform generated by the ramp generator 150. The resulting signal at the output of the comparator op-amp 149 is used to control the duty cycle of the switch in the converter 120.

Figure 2:
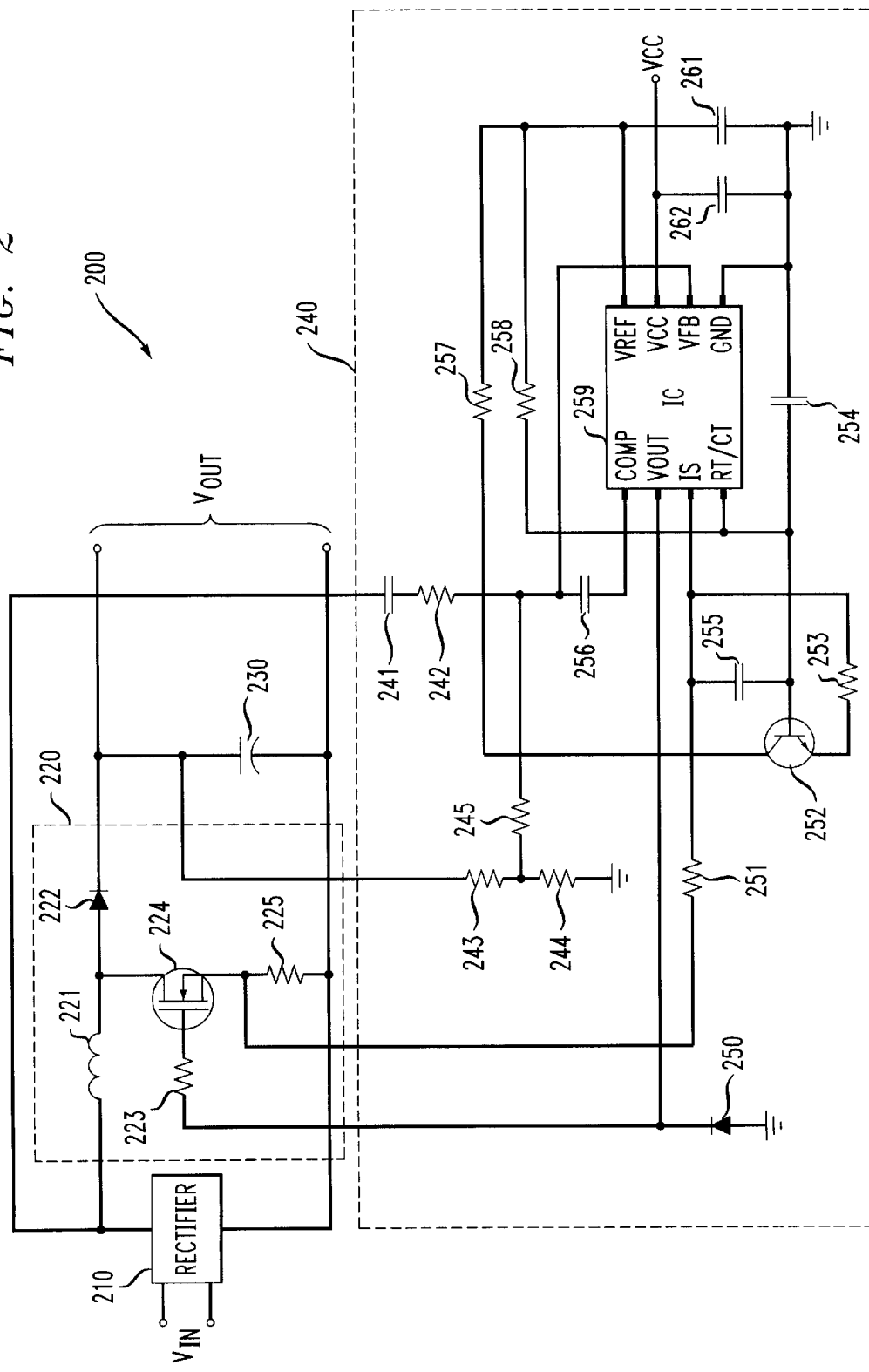
FIG. 2 illustrates a schematic diagram of a switching power supply employing an embodiment of a current mode controller constructed according to the principles of the present invention.

Turning now to FIG. 2, illustrated is a schematic diagram of a switching power supply 200 employing an embodiment of a current mode controller 240 constructed according to the principles of the present invention. The switching power supply 200 includes a rectifier 210 that is coupled to a converter 220. The converter 220 is coupled to an output capacitor 230 and to the current mode controller 240.

The converter 220 includes an inductor 221 coupled to a converter diode 222. The converter diode 222 is also coupled to a converter switch 224, typically a transistor, and to the output capacitor 230. The converter switch 224 is coupled to a sensing resistor 225 that is coupled to the current mode controller 240. Also shown is a converter resistor 223 that is coupled to the converter switch 224 and to the current mode controller 240.

The current mode controller 240 includes a modulator and a compensation circuit. The compensation circuit comprises a compensating capacitor 241 and a compensating resistor 242 that are coupled to a node at the output of the rectifier 210. Also shown is a voltage divider circuit of a first and second resistors 243, 244 that are coupled to the output capacitor 230. A current mode controller integrated circuit (IC) 259 (e.g., UC 3843) is provided with a third resistor 245 coupled in series with a second controller capacitor 256 that is connected to the IC 259 COMP pin. The third resistor 245 is used to provide a signal, proportional to the output voltage of the converter 220, to the VFB pin of the IC 259. A controller diode 250 is coupled to the converter resistor 223 and to the IC 259 VOUT pin that provides a signal that is used to control the converter switch 224. A fourth resistor 251 is coupled between the IS pin of the IC 259 and the sensing resistor 225 to provide the converter switch 224 current signal to the current mode controller 240. A controller transistor 252 is coupled to a fifth resistor 253 coupled between the emitter of the controller transistor 252 and to the IS pin of the IC 259. The controller transistor 252 collector is coupled to a sixth resistor 257 that is connected to the VREF pin of the IC 259. The base of the controller transistor 252 is coupled to a fourth capacitor 255 that is connected to the IC 259 IS pin. A seventh resistor 258 also couples the base of controller transistor 252 to the IC 259 VREF pin. The controller transistor 252 in combination with the fifth resistor 253 and the fourth capacitor 255 provide the ramp shifting circuit used to control the converter switch 224. The capacitor 255 is used to reset the current ramp. A third capacitor 254 is coupled between the IC 259 RT/CT and GND pins. A first and a second capacitor 261, 262 are coupled to signal ground and to the IC 259 VREF and VCC pins, respectively, providing filtering of the IC 259 input bias supply voltage VCC.

The switching power supply 200 is operated with an input voltage ranging from 85 VAC to 260 VAC, an input power of approximately 570 Watts and an output voltage Vo of 397 VDC. The THD of the line current for the different line and load conditions are summarized in Table I below.

TABLE I

| | Line Current THD | | |
|---|---|---|---|
| Input VAC (V) | Power input (W) | Io (A) | THD (%) |
| 100 | 577 | 1.3 | 11.29 |
| 100 | 226 | 0.5 | 28.9 |
| 130 | 563 | 1.3 | 20.9 |
| 130 | 226 | 0.5 | 37.83 |
| 208 | 554 | 1.3 | 22.56 |
| 208 | 225 | 0.5 | 31.07 |
| 230 | 549 | 1.3 | 21.57 |
| 230 | 224 | 0.5 | 39.43 |

Table I illustrates that the operation of the switching power supply 200 employing the control technique of the present invention over the universal input (i.e., 85 to 265 VAC) results in a THD of less than 40% over the entire range.

The switching power supply 200, however, is typically required to operate for an input voltage ranging from 68 VAC to 265 VAC. For the switching power supply 200 to maintain the low line current distortion, the input AC voltage range should be taken into account by the current mode controller 240.

Figure 3:
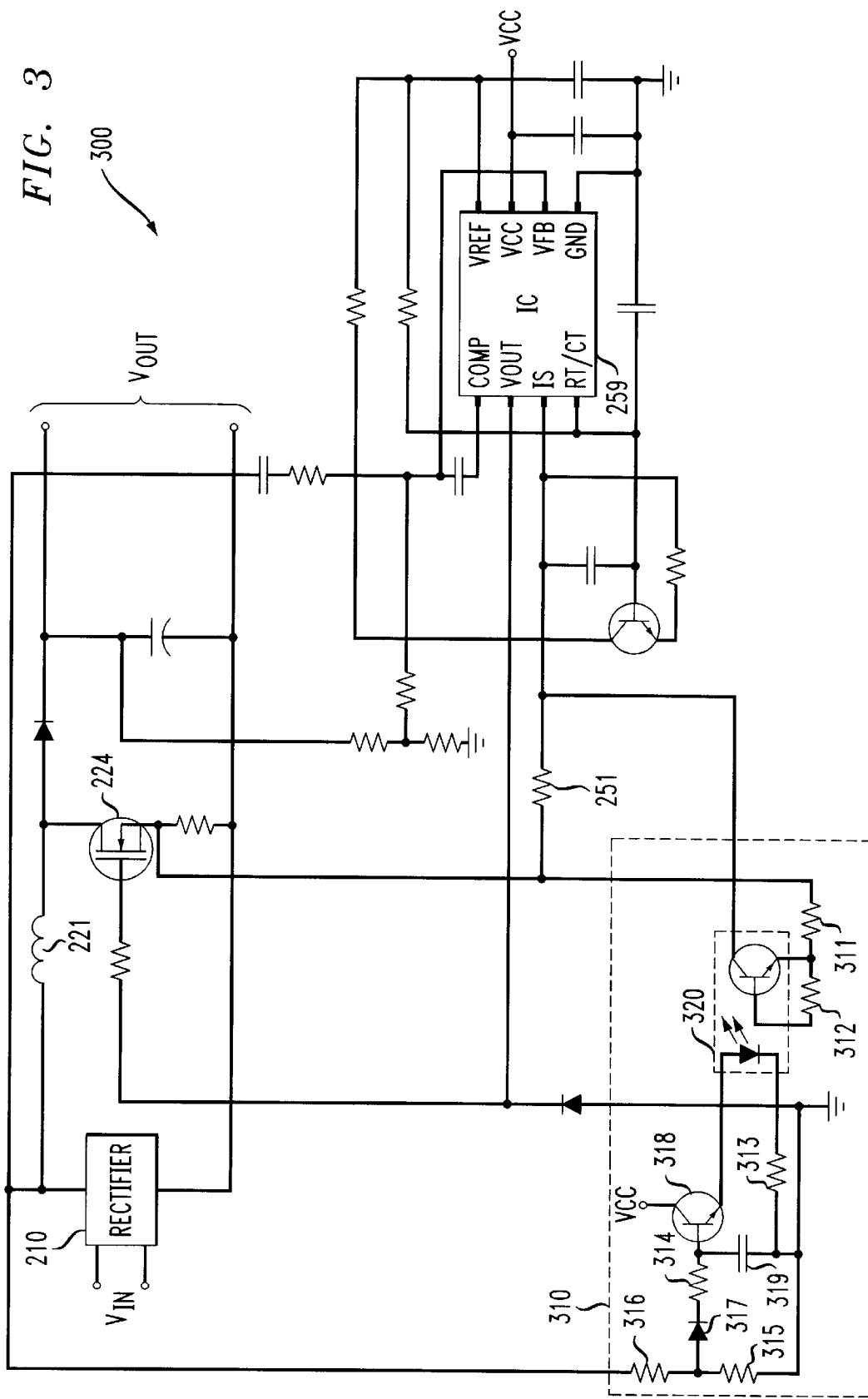
FIG. 3 illustrates another embodiment of the current mode controller of FIG. 2 incorporating an embodiment of a voltage range detection circuit constructed according to the principles of the present invention.

Turning now to FIG. 3, illustrated is another embodiment of the current mode controller of FIG. 2 incorporating an embodiment of a voltage range detection circuit 310 constructed according to the principles of the present invention. The switching power supply 300 is analogous to the switching power supply 200 except that the voltage range detection circuit 310 is added. The voltage range detection circuit 310 detects the AC voltage range and modifies the signal level of the sensed converter switch 224 current being fed back to the current mode controller IC 259.

The voltage range detection circuit 310 includes a ninth resistor 311 that is coupled to a tenth resistor 312. The ninth and tenth resistors 311, 312 are also coupled to an optocoupler 320 (e.g., Model No. CNY-17, as manufactured by Philips or Siemens) that is coupled to a voltage detection transistor 318. The emitter of the voltage detection transistor 318 is coupled to the opto-coupler 320 and the voltage detection transistor 318 collector is coupled to a bias supply voltage VCC. An eleventh resistor 313 is coupled to a fifth capacitor 319 and to the opto-coupler 320. A detection diode 317 is coupled in series with a resistor 314 to the base of the voltage detection transistor 318. A thirteenth and fourteenth resistors 315, 316 are coupled to the converter inductor 221 and form a voltage divider that senses the rectified input voltage.

The opto-coupler 320 is used to add the ninth resistor 311 in parallel with the fourth resistor 251 to scale the sensed converter switch 224 current. The THD of the line current for different line and load conditions and an output voltage Vo of 399 VDC are summarized in Table II below.

TABLE II

| Input Line Current THD | | | |
| --- | --- | --- | --- |
| Input VAC (V) | Power input (W) | Io (A) | THD (%) |
| 100 | 578 | 1.3 | 3.59 |
| 100 | 231 | 0.5 | 10.64 |
| 100 | 144 | 0.3 | 20.13 |
| 130 | 567 | 1.3 | 4.37 |
| 130 | 229 | 0.5 | 24.87 |
| 130 | 144 | 0.3 | 33.98 |
| 210 | 556 | 1.3 | 11.49 |
| 210 | 226 | 0.5 | 32.48 |
| 210 | 142 | 0.3 | 31.06 |
| 230 | 551 | 1.3 | 18.05 |
| 230 | 224 | 0.5 | 37.54 |
| 230 | 141 | 0.3 | 34.34 |

Table II illustrates that the effect of the line and load variations on the generated line current harmonic components are further minimized when the input line voltage is considered by the current mode controller 240.

The level of the sensed line current varies according to the following equation:

$$I_{ac} = P_{in}/V_{ac} \quad (1)$$

where $I_{ac}$ is the rectified line current, $P_{in}$ is the average input power and $V_{ac}$ is the root-mean-square (rms) input line voltage. The average input power $P_{in}$ can be assumed to be constant, whereas the level of the signal fed forward from the rectified line voltage is directly proportional to the line voltage. Attempting to cancel the distortions due to the line voltage variations results in over-modulation of the line current at higher line voltages, typically greater than 240 VAC. The over-modulation can be minimized by sensing the converter inductor 221 current as opposed to the converter switch 224 current and then filtering the sensed signal before it is added to the external ramp waveform from the waveform generator.

Figure 4:
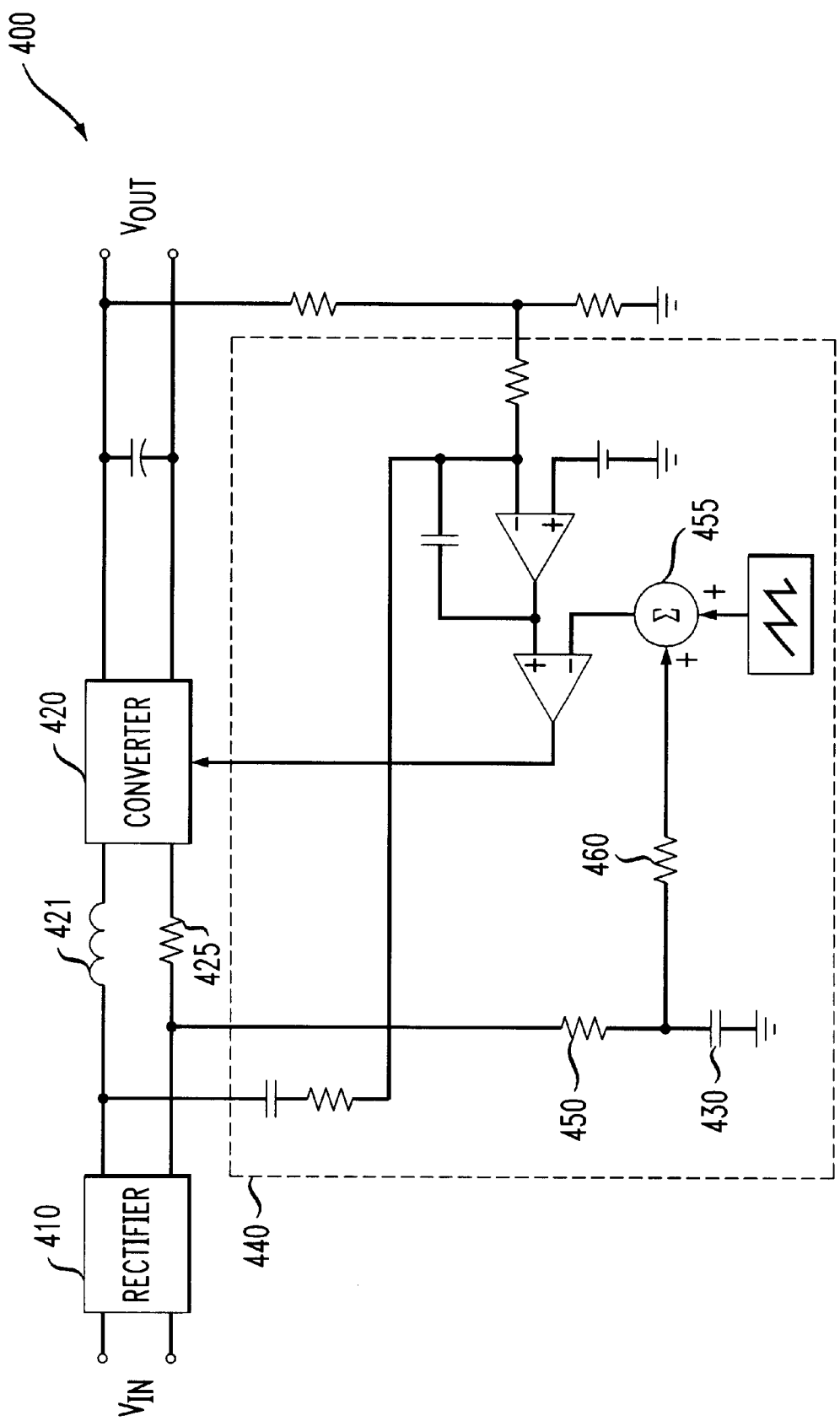
FIG. 4 illustrates a schematic diagram of a switching power supply employing an embodiment of a current mode controller controlling based on inductor current according to the principles of the present invention.

Turning now to FIG. 4, illustrated is a schematic diagram of a switching power supply 400 employing an embodiment of a current mode controller 440 controlling based on inductor current according to the principles of the present invention. The switching power supply 400 is analogous to the switching power supplies 100, 200 illustrated in FIGS. 1, 2 with the difference being that a current of a converter inductor 421, as opposed to the converter switch 224, is sensed and filtered.

The switching power supply 400 includes an additional second and third filtering resistors 450, 460 and a filter capacitor 430. A sensing resistor 425 is now coupled between a rectifier 410 and a converter 420 and is used to sense the converter inductor 421 current instead of the converter switch 224 current. The sensed converter inductor 421 current is then filtered by the filter capacitor 430 prior to being applied to a summing node 455. By filtering the sensed current of the converter inductor 421, the signal level that is fed forward from the rectified line voltage can be increased without the penalty of over-modulation at the higher input line voltages. Eliminating the over-modulation problems at the higher line voltages results in the decrease of the THD over the entire range of input line voltages. The same result from filtering the converter inductor current can also be realized with the use of a "swinging" inductor in the boost stage of the converter. An inductor constructed with a powdered iron core that is allowed to saturate approximately 40 to 60% yields a swinging inductor.

Figure 5:
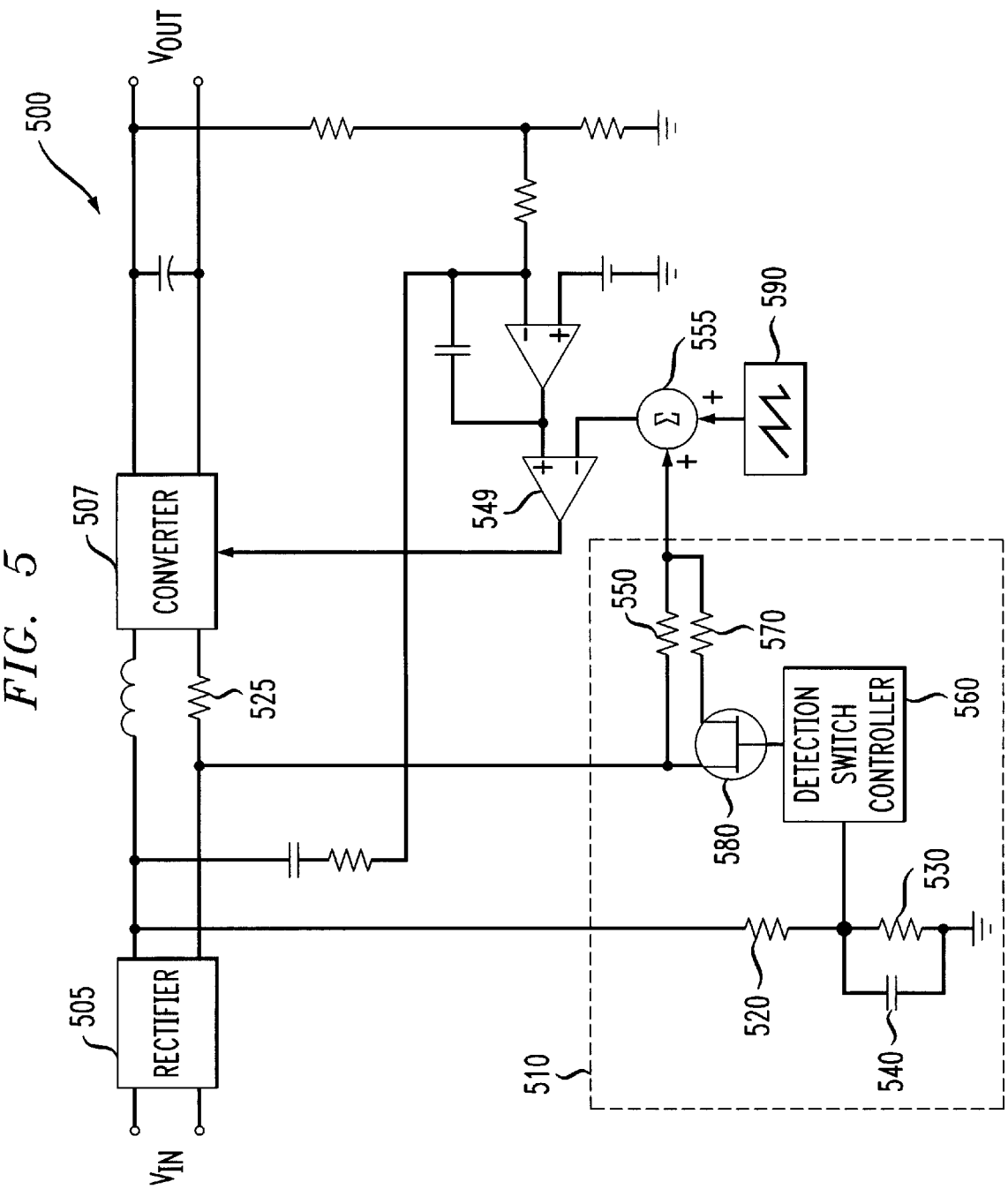
FIG. 5 illustrates a schematic diagram of a switching power supply employing an embodiment of a current mode controller and incorporating an embodiment of an input voltage detection circuit constructed according to the principles of the present invention.

Turning now to FIG. 5, illustrated is a schematic diagram of a switching power supply 500 employing an embodiment of a current mode controller and incorporating an embodiment of an input voltage detection circuit 510 constructed according to the principles of the present invention. The switching power supply 500 is analogous to the aforementioned switching power supplies with the exception that the input voltage detection circuit 510 is incorporated to change the level of a sensed inductor current fed back to the current mode controller. The modification of the sensed inductor current is based on the range of an input line voltage. The input voltage detection circuit 510 includes a first and second detection resistors 520, 530 that are coupled to a detection filter capacitor 540. A sensing resistor 525 is coupled between a rectifier 505 and a converter 507 to sense a converter inductor current. The detection filter capacitor 540, used to filter the sensed input voltage, is coupled to a detection switch controller 560. The detection switch controller 560 is coupled to a detection switch 580 (e.g., transistor) that is coupled to a third and fourth gain controlling resistors 550, 570. The third and fourth gain controlling resistors 550, 570 are coupled to a summing node 555. The summing node 555 is coupled to the inverting input of a comparator op-amp 549 and a ramp generator 590.

The sensed input line voltage is provided to the detection switch controller 560 that determines whether the detection switch 580 is turned ON or OFF. The detection switch 580 is used to configure the resistive path of the sensed inductor current to the comparator op-amp 549. The detection switch controller 560 decides the signal path based on the value of the input line voltage, resulting in a low input line or high input line voltage mode of operation. The third and fourth gain controlling resistors 550, 570 accordingly modifies the sensed inductor current signal. By selectively using a different resistive value based on the input line voltage to change the level of the sensed inductor current, the THD over the entire input line voltage range can be minimized.

Figure 6:
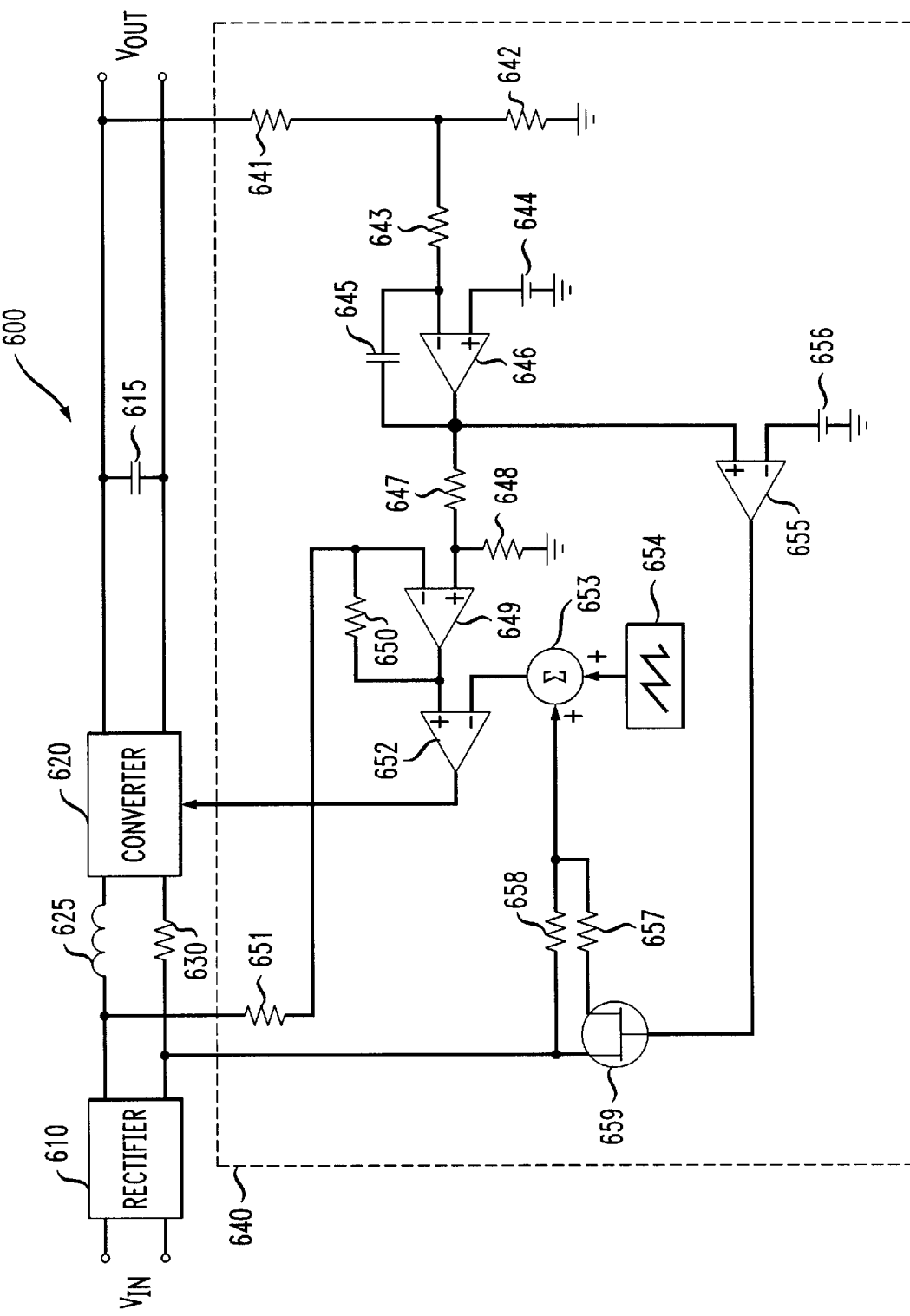
FIG. 6 illustrates a schematic diagram of a switching power supply employing an embodiment of a current mode controller with low/high line detection constructed according to the principles of the present invention.

Turning now to FIG. 6, illustrated is a schematic diagram of a switching power supply 600 employing an embodiment of a current mode controller 640 with low/high line detection constructed according to the principles of the present invention. The switching power supply 600 includes a rectifier 610 that is coupled to a converter 620. The converter 620 is coupled to a output capacitor 615, sensing resistor 630 and a converter inductor 625. Also shown is a current mode controller 640 with low/high line detection that is coupled to the rectifier 610, converter 620, output capacitor 615, sensing resistor 630 and converter inductor 625.

The current mode controller 640 with low/high line detection includes a first and second resistor 641, 642 that make up a voltage divider circuit. A third resistor 643 is coupled to the first and second resistors 641, 642 and to an inverting input of a voltage-loop error operational amplifier (op-amp) 646. An integrating capacitor 645 is coupled (in a feedback path) between the inverting input and the output of the voltage-loop error op-amp 646. The non-inverting input of the voltage-loop error op-amp 646 is coupled to a first reference voltage 644. The output of the voltage-loop error op-amp 646 is coupled to a fourth resistor 647 that is coupled to a fifth resistor 648 and to the non-inverting input of a second op-amp 649. A sixth resistor 650 is coupled to the output and to the inverting input of the second op-amp 649. A compensating resistor 651 is coupled to the converter inductor 625 and to the inverting input of the second op-amp 649. The output of the second op-amp 649 is also coupled to the non-inverting input of a comparator op-amp 652. The comparator op-amp 652 inverting input is coupled to a summing node 653. The summing node 653 is coupled to a seventh and eight resistors 657, 658, respectively, and to a ramp waveform generator 654. The seventh and eight resistors 657, 658 are coupled to the sensing resistor 630 and to a switch 659, which is typically a transistor. The switch 659 is controlled by a switching op-amp 655, which has its non-inverting input coupled to the output of the voltage-loop error op-amp 646 and its inverting input coupled to a second reference voltage 656.

In continuous conduction mode (CCM) operation, the converter's switch (not shown) duty cycle, which is primarily independent of the output power, is primarily determined by the input line voltage. The converter's switch duty cycle is smaller at a high input line voltage and conversely, the converter's switch duty cycle is larger at a low input line voltage. The output of the voltage-loop error op-amp 646 may be used to detect the input line voltage range. A high output from the voltage-loop error op-amp 646 indicates a low input line voltage, while a low output from the voltage-loop error op-amp 646 indicates a high input line voltage. The output from the voltage-loop error op-amp 646 is compared to the second reference voltage 656 at the switching op-amp 655, which determines the switch 659 operation. Depending on the operation of the switch 659, different resistive paths (for high or low line operation) are provided for the sensed inductor current to the summing node 653. Those skilled in the art should be aware that the determination of the input line voltage (low or high) may be accomplished with the evaluation of other circuit parameters. For example, the output of the voltage-feedback op-amp 148 illustrated in FIG. 1 may also be used to determine the input line voltage range information. The voltage-feedback op-amp 148 output peak value is an indication of the input line voltage range. It should be noted that the converter's switch duty cycle does not correctly reflect the input line voltage at DCM during light load operations. However, since higher THD may be tolerated at light load conditions, the converter is still able to meet the power quality standards of IEC-1000.3.2.

The THD can be further improved by continuously adjusting the amplitude of the ramp signal according to the rectified line voltage. The input current THD can maintained at a value substantially lower than 10% over the entire range of the input line voltage with an optimum ramp injection.

Figure 7A:
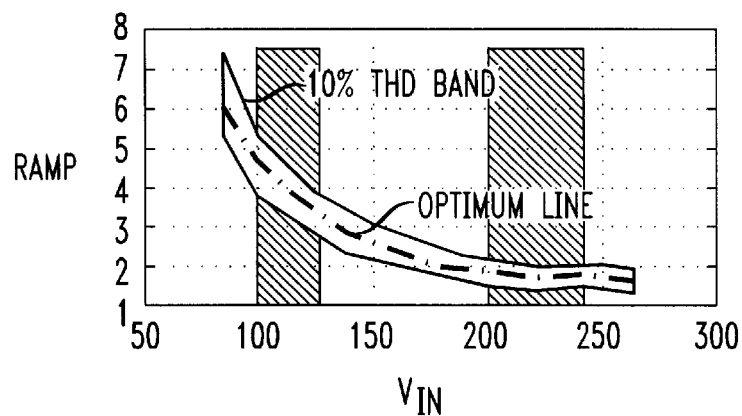
FIG. 7A illustrates an optimum ramp injection as a function of the root-mean-square (rms) input line voltage.

Turning now to FIG. 7A, illustrated is an optimum ramp injection as a function of the root-mean-square (rms) input line voltage. To illustrate the implementation of the optimum injection, a digital or analog function generator may be used to generate a current or voltage proportional to the optimum ramp. The current or voltage generated is then used to control the charging of a RC circuit that produces the desired ramp. It is also possible to approximate the optimum ramp with two simple functions as depicted in FIGS. 7B and 7C.

Figure 7B:
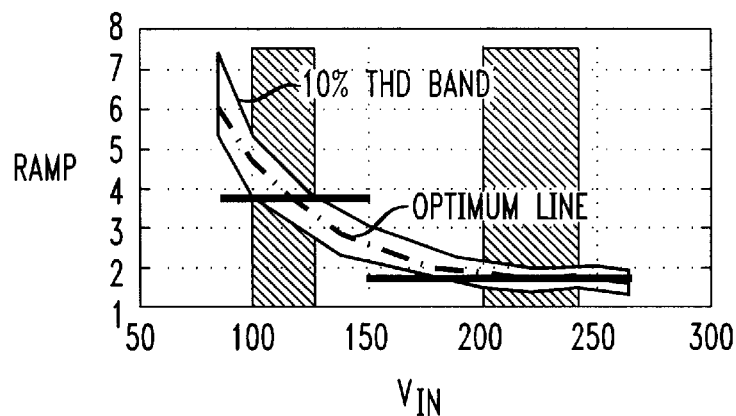
FIG. 7B illustrates a two-level approximation of an optimum ramp injection as a function of the input line voltage.

Turning now to FIG. 7B, illustrated is a two-level approximation of an optimum ramp injection as a function of the input line voltage. The two levels illustrate a low line operation and a high line operation. The result of the approximation is similar to the changing current sensing method described above.

Figure 7C:
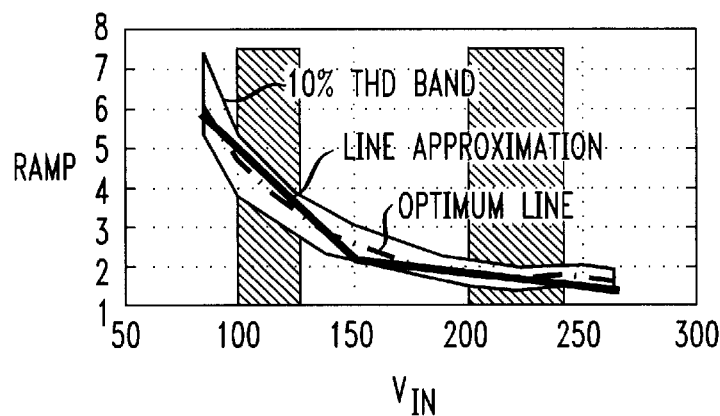
FIG. 7C illustrates a two-line approximation of an optimum ramp injection as a function of the line voltage.

Turning now to FIG. 7C, illustrated is a two-line approximation of an optimum ramp injection as a function of the line voltage. The piece-wise linear curve depicted in FIG. 6C may be produced by an op-amp with diodes in the op-amp's feedback path. The input to the op-amp is the rms input line voltage signal that is generally obtained by filtering the rectified input voltage.

From the above, it is apparent that the present invention provides, for use with a power factor correction circuit, a current mode controller, a method of operating a power factor correction circuit to achieve current mode control thereof and a power supply incorporating the controller or the method. In one embodiment, the controller includes: (1) a modulator, coupled to a switch in the power factor correction circuit, that senses an electrical characteristic and a current passing through the power factor correction circuit and provides, in response thereto, a control signal to the switch and (2) a compensation circuit, coupled to an input of the power factor correction circuit, that provides a compensation signal to the modulator that is a function of a rectified line voltage provided to the input of the power factor correction circuit, the compensation signal causing the modulator to modify the control signal to reduce a THD of the power factor correction circuit.

Although the present invention has been described in detail, those skilled in the art should understand that they can make various changes, substitutions and alterations herein without departing from the spirit and scope of the invention in its broadest form.

What is claimed is:

1. For use with a power factor correction circuit operable in a continuous conduction mode (CCM), a current mode controller, comprising:

a modulator, coupled to a switch in said power factor correction circuit and free of a multiplier, that senses an electrical characteristic and a current passing through said power factor correction circuit and provides a control signal to said switch, said modulator including:
  a voltage-feedback operational amplifier that compares said electrical characteristic to a reference electrical characteristic and generates an error signal in response thereto, and
  a comparator operational amplifier that derives said control signal from a current signal representing said current, a ramp signal from a ramp generator and said error signal; and a compensation circuit, coupled to said power factor correction circuit, that provides a compensation signal to said modulator that is a function of a rectified line voltage provided to said power factor correction circuit, said compensation signal causing said modulator to modify said control signal to reduce a total harmonic distortion of said power factor correction circuit.

2. The controller as recited in claim 1 wherein said electrical characteristic is an output voltage of said power factor correction circuit.

3. The controller as recited in claim 1 wherein said compensation circuit comprises a capacitor coupling said input of said power factor correction circuit to said modulator.

4. The controller as recited in claim 1 wherein said voltage-feedback operational amplifier is coupled to a feedback path including a capacitor.

5. The controller as recited in claim 1 wherein said modulator senses an inductor current.

6. The controller as recited in claim 1 further comprising an input voltage detection circuit that senses a rectified voltage provided to said power factor correction circuit and modifies said current signal as a function thereof.

7. The controller as recited in claim 1 wherein said modulator further comprises a summing node that combines said current signal and said ramp signal to generate a summed signal, said comparator operational amplifier deriving said control signal from said summed signal and said error signal.

8. A method of operating a power factor correction circuit in a continuous conduction mode (CCM) to achieve current mode control thereof, comprising the steps of:

sensing an electrical characteristic and a current passing through said power factor correction circuit;

comparing said electrical characteristic to a reference electrical characteristic and generating an error signal;

deriving a control signal from a current signal representing said current, a ramp signal and said error signal without employing a multiplier function;

modifying said control signal as a function of a rectified line voltage provided to said power factor correction circuit; and providing said control signal to a switch in said power factor correction circuit, said method adapted to reduce a total harmonic distortion of said power factor correction circuit.

9. The method as recited in claim 8 wherein said electrical characteristic is an output voltage of said power factor correction circuit.

10. The method as recited in claim 8 wherein said act of modifying comprises employing a resistor to produce a compensation signal.

11. The method as recited in claim 8 wherein said acts of comparing and deriving are performed by an operational amplifier.

12. The method as recited in claim 8 wherein said act of sensing comprises the step of sensing an inductor current.

13. The method as recited in claim 8 further comprising:

sensing a rectified voltage provided to said power factor correction circuit; and modifying said current signal as a function thereof.

14. The method as recited in claim 8 further comprising:

combining said current signal with said ramp signal to generate a summed signal, said act of deriving further comprising deriving said control signal from said summed signal and said error signal.

15. A switching power supply, comprising:

a rectifier that converts AC power into rectified power having a harmonic voltage component;

a power factor correction circuit, coupled to said rectifier and having a switch, that conditions said rectified power to produce power factor-corrected DC power; and a current mode controller, coupled to said power factor correction circuit, including:

a modulator, coupled to said power factor correction circuit and free of a multiplier, that senses an electrical characteristic and a current passing through said power factor correction circuit and provides a pulse width modulation (PWM) control signal to said switch, said modulator including:

a voltage-feedback operational amplifier that compares said electrical characteristic to a reference electrical characteristic and generates an error signal in response thereto, a summing node that combines a current signal representing said current and a ramp signal from a ramp generator and generates a summed signal, and a comparator operational amplifier that derives said PWM control signal from said summed signal and said error signal, and a compensation circuit, coupled to a node between said rectifier and said power factor correction circuit, that provides a compensation signal to said modulator that is a function of said harmonic voltage component, said compensation signal causing said modulator to modify said PWM control signal to reduce a total harmonic distortion of said power supply.

16. The power supply as recited in claim 15 wherein said electrical characteristic is an output voltage of said power factor correction circuit.

17. The power supply as recited in claim 15 wherein said compensation circuit comprises a capacitor coupling said input of said power factor correction circuit to said modulator.

18. The power supply as recited in claim 15 wherein said voltage-feedback operational amplifier is coupled to a feedback path including a capacitor.

19. The power supply as recited in claim 15 further comprising an input voltage detection circuit that senses said rectified power at said node and modifies said current signal as a function thereof.

20. The power supply as recited in claim 15 wherein said modulator is embodied in an integrated circuit (IC).

21. The controller as recited in claim 1 wherein said modulator is embodied in an integrated circuit (IC).

* * * * *